3,326,950
ORGANIC TITANATE MATERIALS

Harold Garton Emblem, Grappenhall, and Norman Albert Hurt, Lymm, England, assignors to Philadelphia Quartz Company, Philadelphia, Pa., a corporation of Pennsylvania
No Drawing. Filed Apr. 18, 1961, Ser. No. 103,723
Claims priority, application Great Britain, Apr. 29, 1960, 15,106/60
2 Claims. (Cl. 260—429.5)

This invention relates to new organic titanate materials, to their preparation and to their use.

The organic titanate materials of the present invention are condensation products of an aminoalkyl titanate ester and a compound possessing an oxirane grouping, that is the grouping

More particularly, the invention provides condensation products of an aminoalkyl titanate ester and an oxirane compound of the formula

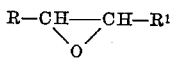

wherein R and $R^1$, which may be the same or different, each represent hydrogen, a saturated alkyl group with 1 to 6 carbon atoms, a phenyl group, or a benzyl group. Examples of the oxirane compound are ethylene oxide, 1,2-propylene oxide, 1,2-butylene oxide, 2,3-butylene oxide, the oxirane octylene oxides, and styrene oxide.

The titanates can be orthotitanates of the general formula $Ti(OR^2)_x(OR^3)_{4-x}$ where $R^2$ is an alkyl group having a substituent amino group possessing one or two hydrogen atoms attached to the amino nitrogen atom, $R^3$ is an unsubstituted alkyl group, and $x$ has the value 1, 2, 3 or 4; they can be polytitanates consisting essentially of units of the average general formula $(R^2O)_y(R^3O)_{2-y}TiO$ where $R^2$ and $R^3$ have the above meanings and $y$ has a value greater than zero and up to 2; or they can be mixtures of orthotitanates and polytitanates.

The aminoalkyl groups of the titanate are suitably those derived from an aminoalcohol of the formula

where $R^4$ is a saturated monohydroxyalkyl group containing 1 to 6 carbon atoms, and $R^5$ is hydrogen or a saturated alkyl group with 1 to 4 carbon atoms. Preferred aminoalkyl groups are those derived from an alcohol of the above formula in which $R^4$ contains 2 to 4 carbon atoms and $R^5$ is hydrogen or an alkyl group with 1 or 2 carbon atoms.

The aminoalkyl titanates can be prepared by interchange processes from alkyl titanates by which the alkyl groups, or some of them, are replaced by aminoalkyl groups. Thus, for example, the alkyl groups of isopropyl and butyl orthotitanates can be partly or wholly replaced by aminoalkyl groups by heating the esters under reflux at an elevated temperature with an appropriate amount of an aminoalcohol comprising a primary or secondary amino group and removing by distillation the isopropyl and butyl alcohols as they are formed. The aminoalcohol used in the interchange process must be of higher boiling point than the alcohol which it replaces so that the replaced alcohol can be removed as it is formed, while unreacted aminoalcohol remains to continue replacement.

If the titanate contains unsubstituted groups $R^3O$, these may contain 1 to 6 carbon atoms and may, for example, be ethoxy, isopropoxy or butoxy groups; preferably any such groups contain 3 to 5 carbon atoms. In such instances, for polytitanates, the value of $y$ in the above formula should be at least 0.1, and is preferably from 0.75 to 2, that is the polytitanates should contain at least 0.1 and preferably from 0.75 to 2 amino-substituted ester groups per titanium atom.

It will be appreciated that an aminoalkyl titanate having a desired content of aminoalkyl groups may be produced from a similar aminoalkyl titanate in which the proportion of aminoalkyl groups is less than that of the desired product by reacting the material with a suitable amount of the appropriate aminoalcohol to increase the aminoalkyl group content of the initial material.

The interchange should be carried out under anhydrous conditions to prevent hydrolysis of the alkyl titanate. The reaction can conveniently be carried out by distilling off the replaced alcohol under reduced pressure.

When an interchange reaction is carried out with only partial replacement of alkyl groups in an alkyl titanate by aminoalkyl groups, the mixed esters which are formed cannot usually be separated by distillation, for in most instances disproportionation occurs and each mixed ester gives rise to a mixture of esters.

The present invention also provides a process for preparing novel organic titanate materials, which process comprises condensing an aminoalkyl titanate having primary or secondary amino groups with an oxirane compound of the formula

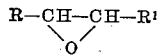

where R and $R^1$ have the above meanings. In order to obtain a satisfactory rate of reaction the condensation process is preferably carried out by reacting the aminoalkyl titanate and the oxirane compound at or near the boiling point of the reaction mixture such as within about 10° C., and more preferably 5° C., of the boiling point of the reaction mixture. Whereas for most cases the condensation reaction is conveniently carried out under normal pressure, for ethylene oxide it may be desirable to carry out the reaction at a higher pressure, for example at a pressure corresponding to a reaction mixture boiling point of about 75° C. The condensation should be carried out under substantially anhydrous conditions to eliminate or minimize the possibility of hydrolysis taking place during the condensation. In practice, the most convenient way, in general, of performing the condensation is to heat the constitutents under reflux.

The number of mols of oxirane compound that can be condensed with an aminoalkyl titanate is dependent on the nature of the oxirane compound. Thus, for the simplest oxirane compound, ethylene oxide, considerable numbers of molecules of this oxirane compound per active amino hydrogen atom of a titanate can be condensed, whereas for other oxirane compounds only up to one mol can be condensed with an aminoalkyl titanate per active amino hydrogen atom of the titanate. For oxirane compounds other than ethylene oxide, about 1 mol of oxirane compound is preferably employed in the condensation per active hydrogen atom of the titanate. The condensation is generally substantially complete after 2 to 4 hours of heating if the oxirane compound is wholly aliphatic.

It will be appreciated that an oxirane compound reacts with a hydrogen atom of the amino nitrogen as follows, considering the case where the oxide is ethylene oxide,

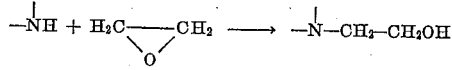

A molecule of ethylene oxide can also condense with the hydroxyl group produced by a previous condensation if excess is employed and the condensation reaction carried out under pressure. In this way 10 mols or more ethylene oxide can be condensed per active amino hydrogen atom of the titanate.

In those cases where the aminoalkyl titanate employed in the condensation contains unsubstituted organic groups, for example isopropoxy or butoxy groups, the titanate-oxirane condensate obtained may undergo a self-condensation reaction, which reaction takes place between the unsubstituted organic group and the hydroxyl group produced by the condensation of the amino group with the oxirane compound, the alcohol corresponding to the unsubstituted group being eliminated. When such a self-condensation reaction, which reaction takes place between is to be minimized, the reaction mixture should not be heated to excessively high temperatures. The self-condensation reaction may also occur if the reaction mixture is heated for longer periods than is necessary to complete the condensation of the titanate and oxirane compound. If the temperature is raised at the end of the titanate-oxirane condensation, then the self-condensation may occur to a greater extent. The alcohol produced in the self-condensation may be removed by distillation.

Many of the products of the invention may be used as parting agents for silicate adhesives to reduce the adherence of such silicates to metal surfaces. Sodium silicate adhesives are used in the production of laminated paper board and it frequently occurs that the adhesive contacts the hot metal platens or rollers used to dry the adhesive. Sodium silicate readily attaches itself to these metal surfaces with which it forms a strong bond when dry making its removal difficult. The products of the invention are relatively stable to alkalies and may be included in sodium silicate adhesives to reduce the adherence of the adhesives to metal surfaces. The preferred products for this purpose are those having good hydrolytic stability, that is those free or substantially free of unsubstituted alkyl groups.

Some of the condensation products of the invention are stable to water and others are readily hydrolyzed to form hydrated titanium dioxide. The behaviour of the products with water depends on whether the product contains hydrolyzable alkoxy groups and on the number of such groups relative to the total number of ester groups.

Many of the condensation products of the invention which are hydrolyzable to hydrated titanium dioxide (including certain water-insoluble products in solution in a mutual solvent for the product and water), may be used as binders for particulate refractory materials. Products having the desired rate of setting for any particular application can be obtained by, inter alia, an appropriate choice of the number of alkoxy groups per titanium atom in the titanate. These binders are of value for binding ceramic materials in the manufacture of moulds for use in investment casting processes and in the manufacture of refractory articles such as refractory bricks or crucibles; the binders of the invention have a relatively good stability and are easier to manipulate than, for example, butyl orthotitanate which hydrolyzes very rapidly. In binding the solid materials, the material to be bound is mixed with an appropriate quantity of the binder, shaped to the form desired, and the composition allowed to set by the action of water. If the water to set the coating is incorporated in the mix, then it may be desirable to also include a mutual solvent for the water and the binder. The products can be used by mixing them with fine refractory powders to give slurries which are then used to coat a wax or other fusible or expendable pattern to derive an accurate and smooth surface in a mould made by investing the coated pattern by the normal methods of the investment process, for example using coarse refractory powders made into a slurry with acid-hydrolyzed ethyl silicate solution. The coated pattern can be allowed to stand to take up atmospheric moisture to set the coating prior to investment but the setting can be speeded up by dusting with a coarse refractory powder moistened with water or an aqueous organic solvent. Furthermore, a ceramic shell mould can be made by the repeated dipping of a wax or other pattern into a slurry of fine refractory material and a binder product of the invention, with alternate dusting of a coarse refractory on to the coating; in order to speed up the process, a coarse refractory powder moistened with water or an aqueous organic solvent can be used for the dusting.

Those condensation products of the invention which are suitable for use as binders may also be mixed with finely-divided refractory material to give compositions which may be applied as thin coatings on those surfaces of a mould or core which contact molten metal during casting to provide highly refractory moulding surfaces.

It can, of course, be readily determined by simple experiment whether any particular product of the invention is a satisfactory binder for the purpose required; for example it may be necessary simply to prepare a slurry of the product with a powdered refractory material and see if on coating a wax pattern with the slurry and exposing the coating to atmospheric moisture, a firm coating is obtained on standing.

The products of the invention when used as binders in the manners above described are particularly valuable where silica-free coatings are desired. They may thus be used with advantage for moulds for casting high-melting alloys (about 1500° C. and above) containing aluminum, titanium or chromium; in such cases suitable refractories are alumina, zircon and stabilized zirconia.

Some of the condensation products of the invention prepared from ethylene oxide are water-soluble and stable in dilute solution for several days before forming a precipitate. Such solutions generally show surface-active properties and the compounds may be used as emulsifying agents.

The following examples illustrate the invention.

*Example 1*

Monoethanolamine orthotitanate was prepared by reacting, under anhydrous conditions, monoethanolamine (4 mols.) with butyl orthotitanate (1 mol.). The mixture was heated to 60° C. and 4 mols. of n-butanol were distilled off. The distillation was carried out under reduced pressure at about 10 mm. Hg so that the n-butanol could be steadily removed.

The product was immediately condensed with propylene oxide (2 mols. per —$NH_2$ group) by heating a mixture of the product and the oxide for 4 to 5 hours under reflux at normal pressure to give a red-brown viscous liquid. The condensation product was very stable to water; it had a $TiO_2$ content of 10.9% (required 10.5%).

*Example 2*

61 g. of monoethanolamine were reacted with 210 g. of n-butyl polytitanate (corresponding to the proportion of 1 mol. of aminoalcohol per mol. of titanium dioxide) following the procedure of Example 1 to give n-butyl (monoethanolamine) polytitanate consisting essentially of units of the average general formula $$TiO(OC_4H_9)(OC_2H_4.NH_2)$$

as a glassy solid.

The product was immediately condensed with propylene oxide (2 mols. per $NH_2$ group) by heating a mixture of the product and the oxide for 4 hours under reflux at normal pressure. The condensation product was a viscous liquid quite stable when exposed to atmosphere but hydrolyzed immediately in water but not to a coherent gel.

*Example 3*

1 mol. of n-butyl orthotitanate was reacted with 2 mols. of monoisopropanolamine following the procedure of Example 1. The resulting product, di-n-butyl-di-monoisopropanolamine orthotitanate, was reacted with propylene 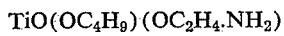 oxide (2 mols. per —$NH_2$ group) by heating a mixture of the product and the oxide for 4 hours under reflux at normal pressure. The condensation product was a red-brown liquid.

*Example 4*

In a manner similar to that described in Example 1 for the preparation of monoethanolamine orthotitanate, isopropyl orthotitanate (1 g. mol.) was reacted with monoethanolamine (2 g. mol.), to give isopropyl monoethanolamine orthotitanate, 2 g. mol. of isopropyl alcohol being recovered. When the interchange was complete, the product was immediately condensed with butylene oxide (2 g. mol., corresponding to 1 mol. per —$NH_2$ group), by heating a mixture of the product and the oxide under reflux at normal pressure for 4 to 5 hours. The condensation product was a light-yellow viscous liquid, stable to water, and sparingly soluble, giving solutions which foamed on stirring. The condensation product may be used as a release agent for silicate adhesives.

The butylene oxide used was a mixture of the normal isomers 1:2 butylene oxide and 2:3 butylene oxide present in the ratio 4:1.

*Example 5*

In a manner similar to that described in Example 1 for the preparation of monoethanolamine orthotitanate, butyl polytitanate (140 g., ⅔ molecular unit) was reacted with monoethanolamine (81 g., ⁴⁄₃ mol.), to give monoethanolamine polytitanate, ⅔ mol. of butanol being recovered. The product was condensed with 156 g. of propylene oxide (⁸⁄₃ mol. plus 1.5% excess to give 2 mols. per —$NH_2$ group) by heating a mixture of the product and the oxide under reflux at normal pressure for 4 hours. On cooling, the condensation product was a glass-like solid, which hydrolyzed almost immediately. The product may be used as a binder for particulate refractory materials.

*Example 6*

17.7 g. monoethanolamine tri-isopropoxy titanate and 16.5 g. ethylene oxide were reacted at 80° C. for 3 hours in a bomb calorimeter. At the end of this time, a further 16.5 g. of ethylene oxide were added, and reacted at 80° C. for 3 hours. The product was left to cool overnight in the bomb. The product was a white, waxy solid, soluble in water without vigorous reaction, giving a stable solution. Analysis of the product showed that 12 mols. of ethylene oxide per —$NH_2$ group of the aminoalkyl titanate had condensed.

*Example 7*

74.8 g. of isopropyl orthotitanate (⅓ mol.) were reacted with 59.3 g. of N-ethyl ethanolamine $$(C_2H_5NH \cdot C_2H_4OH)$$

(⅔ mol.), following the procedure of Example 1. The theoretical amount of isopropyl alcohol was recovered. 40 g. of propylene oxide (⅔ mol., corresponding to 1 mol. per NH group) was added, and the mixture heated under reflux for 4 hours. On cooling, a solid and a liquid product were obtained. These were separated. The solid weighed 71 g. and had a melting point of 50–52° C.; it contained 20.4% $TiO_2$ (the compound $$(iPrO)_3Ti\text{—}O\text{—}C_2H_4\text{—}N(C_2H_5)\text{—}C_3H_7OH$$

has a content of 21.5%. On heating to 160° C. for 3 hours, the solid product gave off a vapour, and formed another solid which contained 23.2% $TiO_2$. (Elimination of one molecule of isopropyl alcohol from 2 mols. of $$(iPrO)_3Ti\text{—}O\text{—}C_2H_4\text{—}N(C_2H_5)\text{—}C_3H_7OH$$

will give a compound having a $TiO_2$ content of 23.4%.) The liquid product weighed 59.5 g., and solidified on cooling in an ice/salt mixture at −6° C. The melting point of the crystals obtained was 40° C., and the $TiO_2$ content was 14.2%; (the compound $$(iPrO)Ti(O\text{—}C_2H_4\text{—}N(C_2H_5)\text{—}C_3H_7OH)_3$$

has a $TiO_2$ content of 14.6%).

This example demonstrates the self-condensation reaction that can occur when the aminoalkyl titanate ester employed in the condensation reaction contains unsubstituted organic groups.

*Example 8*

A coating composition for wax patterns was prepared by mixing 20 g. of the condensation product of Example 3 with 20 g. of dry silica flour, all passing a 170 B.S.S. sieve (which has apertures of width 0.089 mm.). A clean wax pattern was dipped into the coating composition and the coating dusted with sillimanite of such particle size that it passed a 30 I.M.M. sieve (which has apertures of width 0.421 mm.) but was retained on an 80 I.M.M. sieve (which has apertures of width 0.157 mm.). The coating was allowed to stand for 24 hours exposed to atmospheric moisture after which time it had set hard.

*Example 9*

1 part by weight of the condensate prepared as described in Example 1 was stirred into 200 parts by weight of a sodium silicate solution having the weight ratio $SiO_2:Na_2O$ of 3.3:1 and a specific gravity, at 20° C., of 1.395. To demonstrate the effect of the inclusion of the product of the invention in the silicate on the ease of release of the silicate from a hot metal surface, the following test was made.

A small quantity of the treated silicate described above was poured on to a sheet of tin-plate heated to 130° C. together with a similar quantity of the same silicate in which no Example 1 product had been included. Each silicate sample was allowed to dry. The dried untreated silicate could not be completely removed from the hot tin-plate but the dried treated silicate was readily removed.

*Example 10*

A coating composition for wax patterns was prepared from the condensation product of Example 2, by making a slurry of zircon flour, Example 2 product, and isopropyl alcohol, in the proportions

|  | G. |
|---|---|
| Zircon flour | 50 |
| Example 2 product | 10 |
| Isopropyl alcohol | 10 |

This composition was used to prepare a ceramic shell mould by dipping a wax pattern into the composition, then dusting the coated pattern with sillimanite of the particle size given in Example 8. When the coating had hardened (which took about an hour) the pattern was again dipped in the composition and dusted with the sillimanite. The sequence of hardening, dipping and dusting was repeated until 5 dips and 5 dustings had been carried out. The resulting ceramic shell mould was allowed to stand overnight before removal of the wax pattern. The wax was removed by placing the mould and pattern in a furnace at about 1000° C. In this way the wax was removed and the bond matured simultaneously.

Dampening the sillimanite with about 5% (w./w.) of water speeds up the building of the shells by reducing the time required for the coatings to harden.

*Example 11*

A coating composition for wax patterns was prepared from the condensation product of Example 2 by making a slurry of calcined alumina, all passing 200 mesh B.S.S. sieve (which has apertures of width 0.076 mm.), Example 2 product, and isopropyl alcohol, in the proportions

|  | G. |
|---|---|
| Calcined alumina | 20 |
| Example 2 product | 20 |
| Isopropyl alcohol | 20 |

This composition was used to prepare a ceramic shell mould by dipping a wax pattern into the composition, then dusting the coated pattern with ground fused alumina, all passing 25 mesh A.S.T.M. sieve (which has apertures of width 0.71 mm.) and all retained on a 40 mesh A.S.T.M. sieve (which has apertures of width 0.42 mm.). When the coating had hardened (which took about 30 minutes), the pattern was again dipped in the composition, and dusted with the alumina powder. The sequence of hardening, dipping and dusting was repeated until 3 dips and 3 dustings had been carried out. The resulting ceramic shell mould was allowed to stand overnight before removal of the wax pattern. The wax was removed in the manner described in Example 10. The ceramic shell mould produced did not contain silica and was suitable for casting high-melting point alloys.

*Example 12*

1 g. of the condensation product obtained by the process described in Example 6 was dissolved in 50 g. of cold water. The solution was then warmed and 20 g. of molten beeswax were stirred, by means of a high speed stirrer, into the hot aqueous solution. A fine, stable emulsion was obtained.

What is claimed is:
1. A condensation product of (*a*) an oxirane compound of the formula

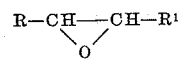

where R and $R^1$ are members selected from the group consisting of hydrogen, saturated alkyl groups with 1 to 6 carbon atoms, the phenyl group and the benzyl group, and (*b*) a polytitanate ester consisting essentially of units of the formula $(R^2O)_y(R^3O)_{2-y}TiO$ where $R^3$ is an unsubstituted alkyl group having 1 to 6 carbon atoms, $y$ has a value greater than 0 and up to 2, and the ester group $OR^2$ is derived from an aminoalcohol of the formula

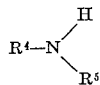

where $R^4$ is a saturated monohydroxyalkyl group containing 1 to 6 carbon atoms and $R^5$ is a member selected from the group consisting of hydrogen and saturated alkyl groups with 1 to 4 carbon atoms.

2. A condensation product as set forth in claim 1 obtained by condensing about 1 mol of oxirane compound per active amino hydrogen atom of the aminoalkyl titanate ester.

References Cited

UNITED STATES PATENTS

| | | | |
|---|---|---|---|
| 2,689,858 | 9/1954 | Boyd | 260—429.5 |
| 2,824,114 | 2/1958 | Bostwick | 260—429.5 |
| 2,991,299 | 7/1961 | Omietanski | 260—429.5 |

OTHER REFERENCES

Fieser et al., Organic Chemistry, Reinhold Publishing Company, New York, 1956, page 240.

Karrer, Organic Chemistry, Nordeman Publishing Company Inc., New York, 1938, page 222.

TOBIAS E. LEVOW, *Primary Examiner.*

ABRAHAM H. WINKELSTEIN, HELEN N. McCARTHY, W. J. VANBALEN, H. M. S. SNEED,
*Examiners.*